June 6, 1967 L. R. BARKER 3,324,424
MICROWAVE CIRCUIT TERMINATION
Filed Feb. 1, 1965
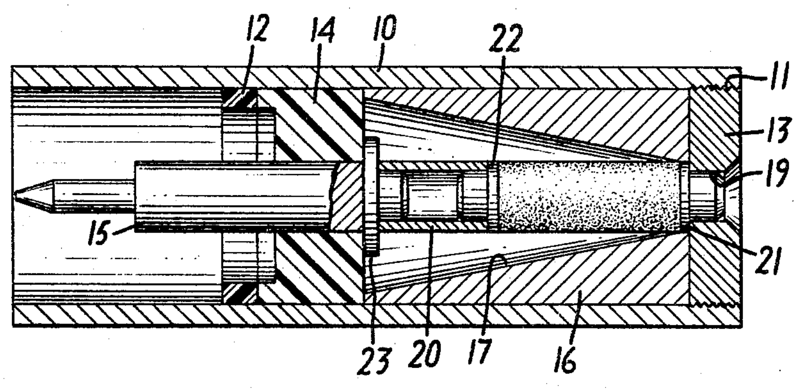
INVENTOR.
LESTER R. BARKER
BY
Brumbaugh, Free, Graves & Donohue
his ATTORNEYS United States Patent Office 3,324,424

Patented June 6, 1967

3,324,424

MICROWAVE CIRCUIT TERMINATION

Lester R. Barker, New Brunswick, N.J., assignor to Electronic Standard Corp. of America, Plainfield, N.J., a corporation of New Jersey Filed Feb. 1, 1965, Ser. No. 429,560
10 Claims. (Cl. 333—22)

This invention relates to termination devices for microwave circuits and, more particularly, to a new and improved termination which is effective over a broad range of microwave frequencies.

In many instances it is necessary to terminate a microwave circuit line with an attenuator which is matched to the characteristic line impedance so that the standing wave voltage ratio (VSWR) produced in the line by the termination is very close to 1.00. Heretofore, microwave circuit terminations have consisted of inductive and capacitance components, the values of which are selected so as to produce a low VSWR at a particular frequency, but at different microwave frequencies such terminations are ineffective. For broader frequency band applications, terminations less sensitive to the microwave frequency have been provided by progressively changing or tapering the relative dimensions of one of the conductors in the microwave line with respect to the other conductor and providing, in conjunction with the taper, an energy-absorbing element. With taper-type terminations, however, the length of the taper must be equal to at least one-half of the maximum wave length of the microwave for which the termination is to be effective. Consequently, even at operating frequencies of a few thousand megacycles, a taper-type termination must be several inches long, thereby effectively precluding its use where miniaturization of components is an important factor.

Accordingly, it is an object of the present invention to provide a new and improved microwave circuit termination which effectively overcomes the above-mentioned disadvantages of the presently known terminations.

Another object of the present invention is to provide a broad band termination having sufficiently small dimensions to permit utilization in miniaturized circuits.

A further object of the invention is to provide a compact circuit termination which is highly effective for signals in the frequency range from zero to at least 8,000 megacycles.

These and other objects of the invention are attained by providing, in conjunction with first and second spaced conductors adapted to be connected to corresponding circuit conductors, a tapered conductive circuit component which is effective to change progressively the spacing between the conductors, a stepped conductive component disposed in selected relation to the tapered component so as to provide an abrupt change in the spacing between the circuit conductors, and a signal attenuator connecting the stepped and tapered components in circuit with the two conductors. With this arrangement, the length of the taper required to terminate microwave signals of a given wave length is effectively reduced to a value substantially less than one-half the given wave length, but at the same time the broad band termination characteristic of the tapered component is maintained. In a particular embodiment wherein the two conductors consist of an inner conductor and a surrounding outer conductor, the tapered component comprises a progressive reduction of the inside diameter of the outer conductor and the stepped component comprises an annular enlargement of the diameter of the inner conductor in the plane of the large diameter end of the taper component, the attenuating element being joined between the small end of the taper and the stepped component.

Further objects and advantages of the invention will be apparent from a reading from the following descriptions in conjunction with the accompanying drawing which represents a view in longitudinal section through a typical microwave circuit termination arranged according to the invention.

In the typical example illustrated in the drawing, the termination includes a tubular member 10 provided with internal threads 11 at one end and with a rigid retaining ring 12 affixed to the interior of the member 10 at a location spaced inwardly from the opposite end. Preferably, the retaining ring 12 is made of insulative material to avoid influencing the electrical characteristics of the termination, and to close the threaded end of the tubular member, a metal disk 13 is threaded into the threads 11. Axially supported within the tube 10 by an insulative washer 14, made of a plastic material such as "Teflon" for example, is a conductive pin 15 which projects toward the open end of the tubular member. Accordingly, the pin 15 comprises the center conductor of the termination while the tubular member 10 is the outer conductor thereof, and it will be readily apparent that these members may have any appropriate configuration adjacent to the open end of the termination which is necessary to provide suitable connection to a microwave circuit component. Rather than being circular, for example, the configuration of the conductors at the open end of the termination may be modified to facilitate connection to circuit elements of non-circular configuration, such as strip line or rectangular wave guide. Also, as is customary with microwave apparatus, all of the conductive components of the termination, which may be made of brass or aluminum for example, are preferably gold-plated on their operative surfaces to provide good surface conductivity.

In accordance with the invention, the termination also includes a metal sleeve 16 mounted within the tube 10 between the disk 13 and the insulator 14 and formed with a tapered internal cavity 17 which progressively decreases in diameter from the end adjacent to the insulator to the opposite end which engages the disk 13. To attenuate signals applied between the outer and inner conductors of the termination, a conventional resistor 18 comprising, for example, a ceramic rod having a surface deposit of carbon, is mounted between an opening 19 in the disk 13 and a conductive tube 20 connected to the inner end of the pin 15, the disk 13 and the tube 20 being engaged by metal rings 21 and 22 mounted on the resistor at opposite ends of the carbon deposit.

In order to allow the utilization of a taper 17 which is considerably shorter than one-half the wave length of the signals to be attenuated, an abrupt change in the spacing between the conductors is provided in juxtaposed relation to the taper. According to the illustrated arrangement, this abrupt change comprises an annular enlargement or step 23 formed on the metal pin 15 at a location within the large diameter end of the taper 17 and, preferably, the plane of the large diameter end of the taper is coincident with the surface of the step which faces toward the open end of the termination. This arrangement is facilitated by the particular structure shown in the drawing wherein the tapered sleeve 16 and the step 23 both abut the inner surface of the insulator 14 and are held thereagainst by the threaded disk 13, the insulator being held in position in the member 10 by the retaining ring 12.

While, for optimum performance, the specific dimensions of the step 23 required to increase the effective length of the taper 17 will depend upon the specific dimension of the taper, the diameter of the step should, in general, be approximately one-half the maximum inside diameter of the taper, and the thickness or longitudinal dimension of the step should be relatively small. In a particular embodiment wherein the taper 17 had a maximum inside diameter of 0.365 inch, a minimum diameter of 0.130 inch, and a taper angle of 12° with respect to the axis so that the total length was approximately one-half inch, and the step 23 had a diameter of 0.190 inch and a thickness of about 0.015 inch, the termination produced a maximum VSWR of 1.05 for signals in the range from zero to 8,000 megacycles, the highest VSWR in the range from zero to 4,000 megacycles being 1.02. If desired, the VSWR characteristic of the termination in the 4,000 to 8,000 megacycle range may be improved at the expense of a slight deterioration in the zero to 4,000 megacycle range characteristic by reducing the diameter of the step 23 to 0.180 inch, all of the other dimensions referred to above remaining the same.

Although the invention has been described herein with reference to a specific embodiment, many modifications and variations therein will readily occur to those skilled in the art. Accordingly, all such variations and modifications are intended to be included within the scope of the invention as defined by the following claims.

I claim:

1. A microwave termination comprising first and second spaced conductor means adapted to be connected to corresponding microwave circuit conductors, conductive taper means providing a progressive change in the spacing between the conductor means, conductive step means in juxtaposed relation to the taper means and providing an abrupt change in the spacing between the conductor means, and attenuator means associated with the step means and the taper means and connected between the first and second conductor means.

2. A microwave termination comprising first and second spaced conductor means adapted to be connected to corresponding microwave circuit conductors, conductive taper means providing a progressive decrease in the spacing between the conductor means, conductive step means in juxtaposed relation to the taper means and providing an abrupt change in the spacing between the conductor means, and attenuator means associated with the step means and the taper means and connected between the first and second coductor means.

3. A microwave termination comprising first and second spaced conductor means adapted to be connected to corresponding microwave circuit conductors, conductive taper means providing a progressive change in the spacing between the conductor means, conductive step means providing an abrupt change in the spacing between the conductor means and located adjacent to the initiation of the progressive change provided by the taper means, and attenuator means associated with the step means and the taper means and connected between the first and second conductor means.

4. A microwave termination comprising first and second spaced conductor means adapted to be connected to corresponding microwave circuit conductors, conductive taper means associated with one of the first and second conductor means and providing a progressive change in the spacing between the conductor means, conductive step means associated with the other of the first and second conductor means in juxtaposed relation to the taper means and providing an abrupt change in the spacing between the conductor means, and attenuator means associated with the step means and the taper means and connected between the first and second conductor means.

5. A microwave termination comprising first and second conductor means adapted to be connected to corresponding microwave circuit conductors, conductive taper means associated with one of the conductor means providing a progressive reduction in the spacing between the conductor means, conductive step means associated with the other of the conductor means located adjacent to the initiation of the progressive reduction provided by the taper means and providing an abrupt change in the spacing between the conductor means, and attenuator means connected between the step means and the taper means at the end of the progressive reduction in spacing provided thereby.

6. A microwave termination according to claim 5 wherein said one conductor means comprises a tubular member and the taper means provides a conical surface in the interior of said one conductor means.

7. A microwave termination according to claim 6 wherein said other conductor means comprises a conductive element axially disposed within said tubular member and the conductive step means comprises an annular enlargement of the axially disposed conductive element.

8. A microwave termination according to claim 7 wherein the abrupt change in spacing provided by the annular enlargement is coplanar with the large diameter end of the conical surface.

9. A microwave termination according to claim 8 wherein the maximum diameter of the annular enlargement is equal to approximately one-half of the large diameter of the conical surface.

10. A microwave termination according to claim 7 including insulating means within the tubular member supporting the conductive element in axial disposition and providing an abutment for the taper means and the annular enlargement of the conductive element, and disk means closing one end of the tubular member so as to hold the taper means and the annular enlargement against the abutment.

References Cited

UNITED STATES PATENTS

| | | | |
|---|---|---|---|
| 2,966,639 | 12/1960 | Heller | 333—22 |
| 3,174,123 | 3/1965 | Frederico | 333—22 X |
| 3,213,392 | 10/1965 | Hedberg | 333—22 |

ELI LIEBERMAN, *Primary Examiner.*

HERMAN KARL SAALBACH, *Examiner.*

R. HUNT, *Assistant Examiner.*